(12) United States Patent
Balakrishnan et al.

(10) Patent No.: US 6,275,358 B1
(45) Date of Patent: Aug. 14, 2001

(54) CONDUCTOR TRACE ARRAY HAVING PASSIVE STUB CONDUCTORS

(75) Inventors: Arun Balakrishnan, Lafayette, CO (US); Christopher Carpenter, Sunnyvale, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/266,442

(22) Filed: Mar. 11, 1999

Related U.S. Application Data

(63) Continuation-in-part of application No. 08/784,559, filed on Jan. 21, 1997, now Pat. No. 6,038,102.

(51) Int. Cl.⁷ .................................................... G11B 5/48
(52) U.S. Cl. ..................................... 360/264.2; 360/266.3
(58) Field of Search .............................. 360/234.4, 234.5, 360/244.1, 245.8, 245.9, 264.2, 266.3

(56) References Cited

U.S. PATENT DOCUMENTS

| | | | |
|---|---|---|---|
| 5,606,477 | * | 2/1997 | Erpelding et al ............. 360/245.9 X |
| 5,631,786 | * | 5/1997 | Erpelding ....................... 360/264.2 X |
| 5,631,788 | * | 5/1997 | Richards ........................... 360/264.2 |
| 6,038,102 | * | 3/2000 | Balakrishnan et al. ........... 360/264.2 |

* cited by examiner

Primary Examiner—William Klimowicz
(74) Attorney, Agent, or Firm—Steven G. Roeder

(57) ABSTRACT

A conductor trace array includes an electrically insulative support substrate and a plurality of pairs of electrical signal conductor traces and a plurality of pairs of passive electrical conductor traces. All of the traces are formed along substantially parallel paths in a single layer on the substrate. Each pair of the electrical signal conductor traces is arranged on the support substrate such that they are positioned in a space defined between each pair of passive electrical conductor traces. As a result, each pair of signal conductor traces has a passive electrical conductor trace positioned immediately adjacent thereto. The passive conductor traces generally follow a geometry of the signal conductor traces and thereby form a capacitive coupling relationship therebetween. This capacitive coupling relationship increases the characteristic impedance of the signal conductor traces. A preferred application is for interconnecting a head and a preamplifier/drive circuit within a hard disk drive, wherein the interconnecting trace is expressly provided upon an E-block of the activator.

18 Claims, 7 Drawing Sheets

CONDUCTOR TRACE ARRAY HAVING PASSIVE STUB CONDUCTORS

CROSS-REFERENCE TO RELATED PATENTS

This application is a continuation-in-part (CIP) of U.S. Pat. No. 6,035,102, entitled: "Conductor Trace Array Having Interleaved Passive Conductors", filed on Jan. 21, 1997, having issued on Mar. 14, 2000 the subject matter thereof is hereby incorporated by reference.

FIELD OF THE INVENTION

This invention relates generally to a structure and method for controlling electrical properties of a conductor trace array for connecting a magnetic head to electronics in a magnetic hard disk drive. More particularly, the present invention provides electrically isolated ("passive") conductor strips which are positioned on either side of each pair of current-carrying ("active") conductor strips to improve the characteristic impedance of the conductor trace array.

BACKGROUND OF THE INVENTION

Contemporary magnetic hard disk drives typically include a rotating rigid storage disk and a bead positioner for positioning a data transducer at different radial locations relative to the axis of rotation of the disk, thereby defining numerous concentric data storage tracks on each recording surface of the disk. The head positioner is typically referred to as an actuator. Although numerous actuator structures are known in the art, in-line rotary voice coil actuators are now most frequently employed due to their simplicity, high performance, and their ability to be mass-balanced about their axis of rotation, the latter being important for making the actuator less sensitive to perturbations. A closed-loop servo system within the disk drive is conventionally employed to operate the voice coil actuator and thereby position the heads with respect to the disk storage surface.

The read/write transducer, which may be of a single or dual element design, is typically deposited upon (or carried by) a ceramic slider structure having an air bearing surface for supporting the transducer at a small distance away from the surface of the moving medium. Single write/read element designs typically require two-wire connections while dual designs having separate reader and writer elements require two pairs of two-wire connections. Magnetoresistive (MR) heads having separate inductive write elements in particular generally require four wires. The combination of an air bearing slider and a read/write transducer is also known as a read/write head or a magnetic recording head.

Sliders are generally mounted to a gimbaled flexure structure attached to the distal end of a suspension's load beam structure. A spring biases the load beam and the head towards the disk, while the air pressure beneath the head developed by disk rotation relative to the slider pushes the head away from the disk. The gimbal enables the slider to present a "flying" attitude toward the disk surface and follow its topology. An equilibrium distance defines an "air bearing" and determines the "flying height" of the head. By utilizing an air bearing to support the head away from the disk surface, the head operates in a hydrodynamically lubricated regime at the head/disk interface rather than in a boundary lubricated regime. The air bearing maintains a spacing between the transducer and the medium which reduces transducer efficiency. However, the avoidance of direct contact vastly improves the reliability and useful life of the head and disk components.

Currently, nominal flying heights are on the order of 0.5 to 2 microinches. The magnetic storage density increases as the head approaches the storage surface of the disk. Thus, a very low flying height is traded against device reliability over a reasonable service life of the disk drive. At the same time, data transfer rates to and from the storage surface are increasing; and, data rates approaching 400 megabits per second are within practical contemplation.

The disk drive industry has been progressively decreasing the size and mass of the slider structures in order to reduce the moving mass of the actuator assembly and to permit closer operation of the transducer to the disk surface, the former giving rise to improved seek performance and the latter giving rise to improved transducer efficiency that can then be traded for higher areal density. The size (and therefore mass) of a slider is usually characterized with reference to a so-called standard 100% slider ("minislider"). The terms 70%, 50%, and 30% slider ("microslider", "nanoslider", and "picoslider", respectively) therefore refer to more recent low mass sliders that have linear dimensions that are scaled by the applicable percentage relative to the linear dimensions of a standard minislider. Sliders smaller than the 30% picoslider, such as a 20% "femtoslider", are presently being considered and are in early development by head vendors. As slider structures become smaller, they generally require more compliant gimbals; hence, the intrinsic stiffness of the conductor wires attached to the slider can give rise to a significant undesired mechanical bias effect.

Trace interconnect arrays typically support or aid in supporting the slider next to the data storage surface, and to connect read and write elements of the head with external circuitry. Two conductor paths are typically required for the write element, and two conductor paths are required for the read element, of the magnetic head. The interconnect array, typically formed on a polyimide film substrate, may extend from the slider to a preamplifier/write driver circuit, either directly, or via one or more intermediate interconnect trace arrays. These designs typically include trace segments extending from the flexure to a signal connection point which may be located on the side of the rotary actuator, for example. Since these conductor trace interconnect arrays are low in profile, and are precisely formed printed circuits upon plastic film substrates, they tend to have more predictable mechanical properties than discrete wire conductors used in the past, thereby improving tolerances in manufacturing and operation.

In transmission lines and interconnects of the type under contemplation, it is important to reduce the effect of the interconnect on the source (the preamp circuit for the read element and the write driver circuit for the write element, in a magnetic recording head, for example). The inductance and capacitance parameters of the trace array introduce a phase-change in the current/voltage waveforms, and most designs are made to minimize undesired effects of inductance and/or capacitance upon overall circuit performance. Moreover it is desirable to have a uniform characteristic impedance at any point along the trace array because such uniform characteristic impedance reduces signal distortion as well as minimizes reflections between the source and the head. The characteristic impedance per unit length of the traces included within the array is defined, at high frequencies, as the square-root of the ratio of the inductance to the capacitance of the traces.

One typical length of a trace array employed within a 3.5 inch disk drive, for example, is 45 millimeters (mm). One segment of this trace array is positioned over and in a close or contact relationship with the flexure and loadbeam structures and is approximately 18 mm in length. Another segment of the trace is supported in air and extends from the loadbeam to the preamplifier/write driver circuit and is approximately 27 mm in length. Other form factor disk drives, such as 2 inch disk drives or 3 inch disk drives for example, will also have similarly proportioned trace array segment lengths.

The 27 mm segment of the array is suspended in air because it is desirable during the manufacturing process to provide a flexible segment of the trace array to facilitate connection with the preamplifier/write driver circuit. As a result, the capacitance of the conductor traces in this segment of the array is relatively low with respect to ground. This relatively low capacitance results in a generally higher characteristic impedance per unit length in this segment of the array. On the other hand, the 18 mm segment of the array, which is positioned in close proximity to the flexure and loadbeam structures, which structures are typically formed of stainless steel, forms a ground plane between flexure and loadbeam structures and the 18 mm segment of the array. As a result, a capacitive coupling relationship is formed between this segment of the array and the stainless steel flexure/loadbeam structures. The capacitive coupling relationship results in an increase in the capacitance of the signal traces defined within this 18 mm segment of the array as compared to traces defined in the 27 mm segment of the array. This increase in capacitance results in a decrease in the characteristic impedance per unit length of the 18 mm segment of the array. Accordingly, the characteristic impedance per unit length of the 18 mm segment of the array is lower than the characteristic impedance per unit length of the 27 mm segment of the array. As previously stated, such characteristic impedance disparities along the trace array undesirably result in increased signal distortion as well as increased reflections between the slider and source.

Conventional trace interconnect arrays have a further capacitance disparity, which further contributes to the aformentioned characteristic impedance disparity, because the conductor traces defined within the array have varying geometries and spacings between each other as the traces extend from the slider to the preamplifier/write driver circuit. By way of example, the 18 mm segment of the trace array includes four conductor traces. The four conductor traces are arranged into two groups, where each group has two traces that extend along the longitudinal edges of the loadbeam between the slider and a region away from the slider. Each group of traces has a spacing arrangement: conductor trace, space, conductor trace of 40-30-40 microns respectively and a trace height of approximately 10 microns. Continuing to follow the traces back towards the 27 mm segment of the array, each trace within the two groups continues to taper outwardly to a final spacing arrangement: conductor trace, space, conductor trace of 100-30-100 microns wide respectively. Moving from the 18 mm segment of the array to the 27 mm segment of the array, the traces yet further continue to taper outwardly to a uniform spacing arrangement: conductor trace, space, conductor trace of 200-30-200 microns wide respectively throughout the 27 mm segment of the trace array and where the height of the traces in this region of the array are approximately 18 microns.

One method to reduce inductance and/or capacitance is to ensure that reactive components of the interconnect are minimal. There is usually a trade-off between the inductance and the capacitance, as reducing inductance by moving the conductors closer together increases the inter-conductor capacitance. Once conductor trace spacing and geometry is fixed at a minimum distance and shape, respectively, which is limited by manufacturing tolerances, the inductance and capacitance remains substantially constant at a particular frequency.

Since the characteristic impedance per unit length of the 27 mm segment is higher than the 18 mm segment as described above, it is desirable to hold the impedance of the 18 mm segment constant while modifying the impedance of the 27 mm segment to impedance match the 18 mm segment. One method of matching the characteristic impedance of the 18 mm and 27 mm segments of the array is to introduce a ground plane, such as stainless steel or metal foil, to the 27 mm segment of the array. The ground plane will provide a capacitive coupling relationship between the 27 mm segment of the array and the plane, which increases the capacitance of this segment of the trace. As a result, the characteristic impedance of this segment of the array is decreased to more closely match that of the 18 mm segment of the array. However, introduction of this ground plane arrangement to the 27 mm segment of the trace raises the cost of a relatively inexpensive trace array as well as introduces additional process steps to the manufacturing process of the array. Moreover, the addition of the ground plane will undesirably affect the flexibility of the 27 mm segment of the trace array, where such flexibility is necessary for bending and shaping the array during connection to the preamplifier/write driver circuit.

Thus, a hitherto unsolved need has remained for a trace interconnect array having more effectively controlled inductance and capacitance characteristics that does not introduce additional process steps or cost to the manufacturing process of the array.

SUMMARY OF THE INVENTION WITH OBJECTS

A general object of the present invention is to improve electrical characteristics of a conductor trace array for electrically interconnecting a read/write head to associated read/write circuitry in a manner which overcomes limitations and drawbacks of the prior art.

Another object of the present invention is to improve electrical impedance characteristics of a conductor trace array by providing electrically isolated, passive conductor traces, where the current carrying conductor traces are formed in a space defined between the passive conductor traces.

A further more specific object of the present invention is to provide current carrying traces of a conductor trace array that are formed in a space defined between electrically isolated, passive conductor traces such that a capacitive coupling relationship is formed between each current carrying conductor trace and its immediately adjacent passive conductor trace for increasing the capacitance of each current carrying conductor trace.

Another specific object of the present invention is to provide a conductor trace array having improved electrical characteristics within a single layer conductor trace array using existing techniques at relatively low complexity and low expense.

Accordingly, a conductor trace array is provided for connecting a read/write head/slider assembly to read/write circuitry. The conductor trace array includes an electrically insulative support substrate and a plurality of pairs of electrical signal conductor traces formed along substantially parallel paths in a single layer on the substrate. In accordance with the present invention, a plurality of pairs of passive electrical conductor traces are also formed along substantially parallel paths in a single layer on the substrate. The plurality of pairs of passive electrical conductor traces are spaced apart and electrically isolated from the electrical signal traces. Moreover, each trace defined within each of the pairs of passive electrical conductor traces are separated, with respect to each other, by a space that is wide enough to accommodate one pair of electrical signal traces. Accordingly, each pair of the electrical signal traces formed on the substrate is embedded between each pair of the passive electrical conductor traces. The passive conductor traces generally follow the geometry of the electrical signal traces and form a capacitive coupling relationship with the pair of electrical signal traces, resulting in the increased capacitance of the current-carrying electrical signal conductor traces.

As a specific example of the present invention, two pairs of electrical signal conductor traces are formed in the single layer on the substrate and follow generally parallel paths: one pair of the conductors is for electrically connecting a read element of the head to a preamplifier circuit, and the other pair of the conductors is for connecting a write element of the head to a write driver circuit. Additionally, two pairs of passive conductor traces are also formed on the substrate and generally follow a parallel path to that of the electrical signal conductor traces. Each of the traces forming each pair of passive conductor traces are separated by a space that is wide enough to accommodate one pair of the electrical signal conductor traces. Thus in this example, the one pair of electrical signal conductor traces connecting the read element of the head to the preamplifier circuit is formed on the substrate in the space defined between the traces forming a pair of passive conductor traces. The other pair of electrical signal traces connecting the write element of the head to the write driver circuit is formed on the substrate in the space defined between the traces of the other pair of passive conductor traces.

Another aspect of the present invention comprises an integrated load beam/conductor trace assembly which supports a read/write head/slider assembly adjacent to a rotating data storage medium of a hard disk drive and electrically interconnects the head to read/write circuitry of the drive. The integrated load beam assembly comprises a flexure and a conductor trace array. The flexure is secured to the load beam and includes a generally planar conductive member extending to the read/write head/slider assembly. A first electrical insulation layer is disposed on the conductive member, and a plurality of electrical traces are disposed on the first electrical insulation layer. One end of the plurality of electrical traces is connected to the read and write elements of the head/slider assembly. An opposite end of the plurality of electrical traces, which extends away from the head/slider assembly, terminates at connection pads defined on the first insulation layer. The conductor trace array connects the connection pads of the electrical traces and the read/write circuitry. The conductor trace array comprises an electrically insulative support substrate and a plurality of pairs of electrical signal conductor traces formed along substantially parallel paths in a single layer on the electrically insulative support substrate.

Additionally, a plurality of pairs of passive electrical conductor traces are also formed on the substrate and follow a substantially parallel path and geometry as that of the electrical signal conductor traces. Each of the traces defined within each pair of passive conductor traces is separated from the other by a space that is wide enough to accommodate one pair of the electrical signal conductor traces. Accordingly, each pair of the plurality of pairs of the electrical signal conductor traces is formed in the space defined between each pair of the plurality of passive conductor traces. However, the pairs of passive conductor traces do not extend to the portion of the trace assembly that is in close proximity to the integrated loadbeam assembly. In this arrangement, a capacitive coupling relationship is formed between a segment of each current-carrying signal trace and the passive conductor trace positioned immediately adjacent thereto. Preferably, the electrically insulative support substrate comprises a thin flexible polyimide film.

These and other objects, advantages, aspects, and features of the present invention will be more fully appreciated and understood upon consideration of the following detailed description of preferred embodiments presented in conjunction with the accompanying drawings.

DETAILED DESCRIPTION OF PREFERRED EMBODIMENTS

Figure 1:
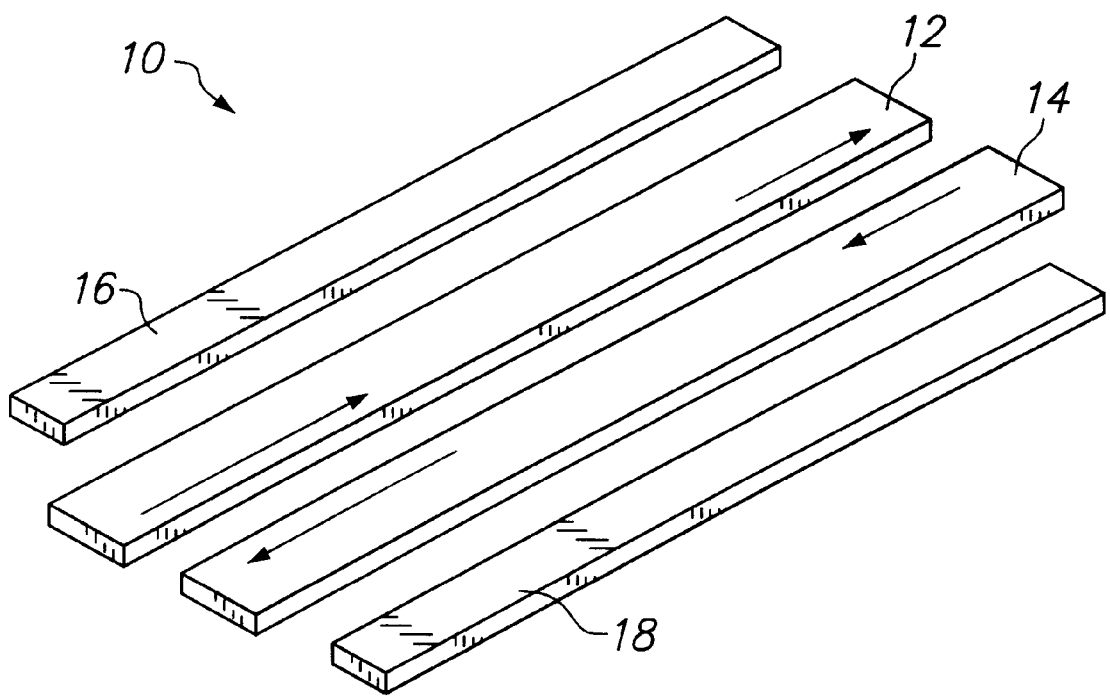
FIG. 1 is a greatly enlarged, highly diagrammatic isometric view of a two-conductor trace array incorporating passive conductor traces in accordance with principles of the present invention.

Referring to the drawings, where like characters designate like or corresponding parts throughout the views, FIG. 1 presents a highly diagrammatic, isometric view of a single pair or two-conductor single-layer trace interconnect array 10 incorporating a pair of passive conductor strips 16 and 18 in order to improve impedance characteristics in accordance with principles of the present invention. In FIG. 1, two parallel active conductor traces 12 and 14 are carrying signal current. Trace 12 carries current in e.g. a forward direction, while trace 14 carries current in a reverse direction, as shown by arrows in FIG. 1. As further shown in FIG. 1, the two current-carrying signal conductor traces 12 and 14 are positioned in a space between the pair of passive conductors 16 and 18, which are formed in the same layer in and are substantially parallel to the signal conductor traces 12 and 14.

Due to the proximity of conductive signal traces 12 and 14 and passive conductive traces 16 and 18, a capacitive coupling relationship is formed between each conductive signal trace 12 and 14 and each passive conductive trace 16 and 18 positioned immediately adjacent thereto. As a result, the inter-conductor capacitance defined between conductive signal trace 12 and adjacent passive trace 16 is increased. Similarly, the inter-conductor capacitance defined between conductive signal trace 14 and adjacent passive trace 18 is increased. In this manner, the capacitance of the trace array is increased. In the preferred embodiment of the present invention the conductor layout results in an increase in capacitance of the array and, the characteristic impedance, which is the square root of the ratio of inductance to capacitance, is reduced.

Also, the passive conductor strips 16 and 18 are formed in the same plane (layer) as the patterns defining conductor traces 12 and 14, thus there is no additional cost associated with fabricating trace interconnect arrays which desirably include the passive conductor traces.

Figure 2:
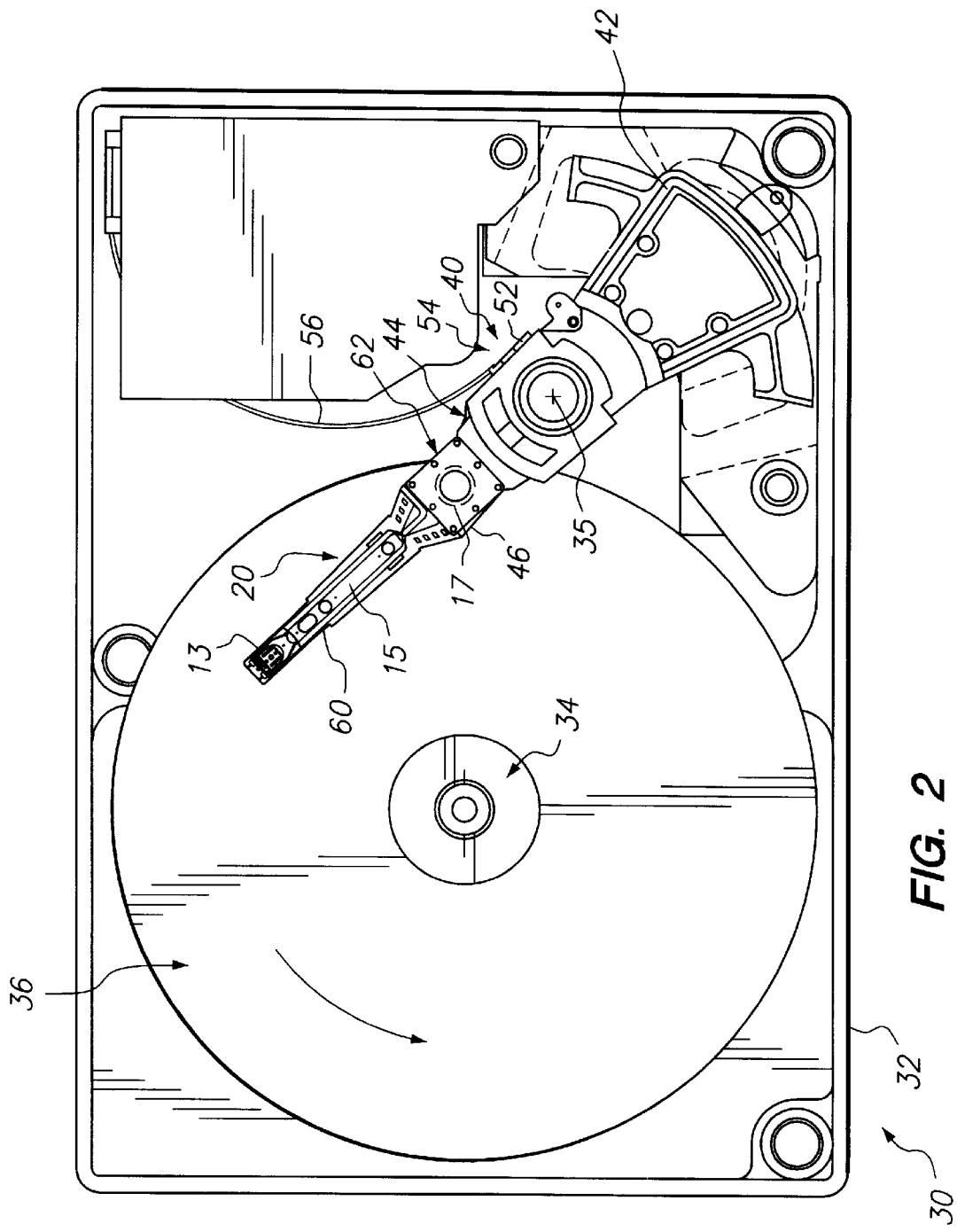
FIG. 2 is an enlarged, diagrammatic plan view of a head disk assembly of a hard disk drive which includes an actuator having a suspension assembly with a conductor trace array with passive conductor strips in accordance with principles of the present invention.

FIG. 2 represents a top plan view of a head/disk assembly (HDA) of a hard disk drive 30. The hard disk drive 30 employs at least one load beam assembly 20 having a trace interconnect array 60 as a preferred embodiment of the present invention. FIG. 2 shows load beam assembly 20 including head 13 supported by a flexure 15 and the trace interconnect array 60 employed within its intended operating environment.

Disk drive 30 includes a rigid base 32 supporting a spindle 34 (and spindle motor, not shown) for rotating at least one storage disk 36 in a direction shown by the curved arrow. Drive 30 also includes a rotary actuator assembly 40 rotationally mounted to base 32 at a pivot point 35. The actuator assembly 40 includes a voice coil 42 which, when selectively energized by control circuitry (not shown), moves and thereby positions an actuator E-block 44 and head arms 46 (and load beam assemblies 20) at radial track positions defined on the facing surfaces of storage disks 36. All load beam assemblies 20 are secured at their proximal ends 17 to distal ends of head arms 46, often by conventional ball-swaging techniques.

Conventionally, but not necessarily, two load beam assemblies 20 are attached to head arms 46 between disks 36; and, one load beam structure 20 is attached to a head arm above and a head arm below the uppermost and lowermost disks of a disk stack comprised of multiple disks 36 spaced apart on spindle 34. The trace interconnect structure 60 may connect directly to a preamplifier circuit substrate. In FIG. 2 the interconnect structure 60 preferably includes a suspension array segment 61 and a flexible trace/film segment 62 which in turn extends to a hybrid circuit substrate 52 secured to a side of E-block 44. Hybrid circuit 52 typically comprises a suitable substrate including either a trace-patterned polyimide film base or a trace-patterned ceramic base, and it secures and connects to a semiconductor chip 54 forming a read preamplifier/write driver circuit for read and write elements of magnetic recording head 13. Most preferably, the chip 54 is nested between the hybrid circuit 52 and the E-block sidewall, and is secured to the sidewall by a suitable conductive adhesive or thermal transfer compound so that heat generated during operation of chip 54 is dissipated into the E-block by conduction, and outwardly into the ambient air volume by convection. Another flex circuit 56 provides electrical connections to and from the substrate 52 and other electronic circuitry of the disk drive (not shown in FIG. 2).

Figure 3:
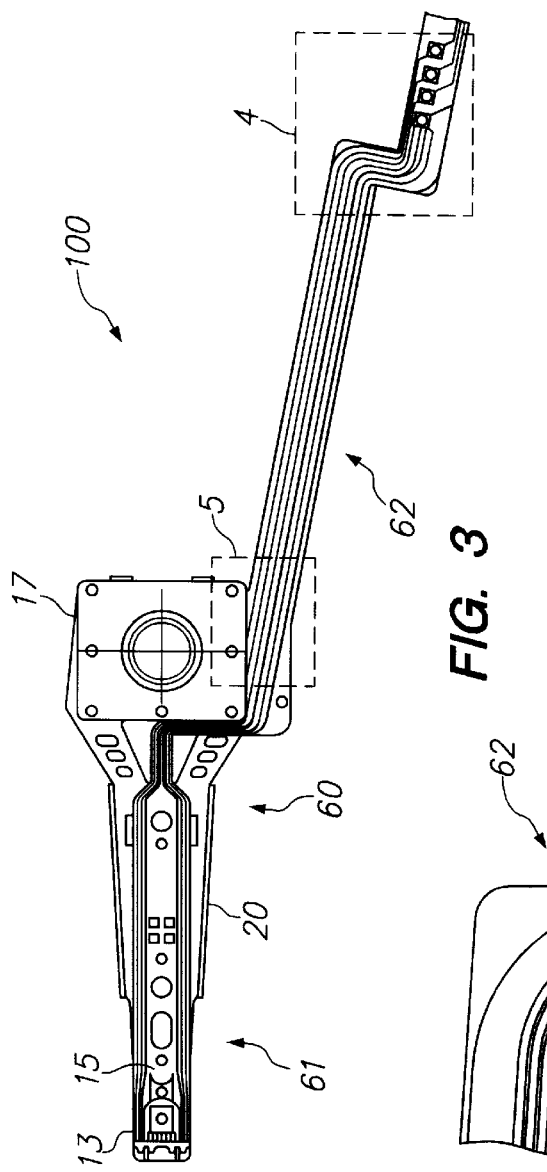
FIG. 3 is an enlarged diagrammatic plan view of the trace interconnect array shown in the FIG. 2 head disk assembly and showing an integrated flexure/conductor load beam structure and an elongated interconnect segment extending from the load beam structure to preamplifier/driver circuitry and having conductive traces positioned in spaces defined between passive conductor traces in accordance with principles of the present invention.

FIG. 3 shows a more detailed view of a trace interconnect structure 60 and trace/film segment 62. The load beam structure 20 is described in greater detail in commonly assigned, copending U.S. patent application Ser. No. 08/720, 836 filed on Oct. 3, 1996, for "Suspension With Integrated Conductors Having Trimmed Impedance", by the present inventors and others, the disclosure thereof being incorporated herein by reference. As improved by the present invention, the interconnect structure includes at least segment 62 carrying a plurality of pairs of passive conductor traces extending from the load beam 20 to the preamplifier (see FIG. 2).

Figure 4:
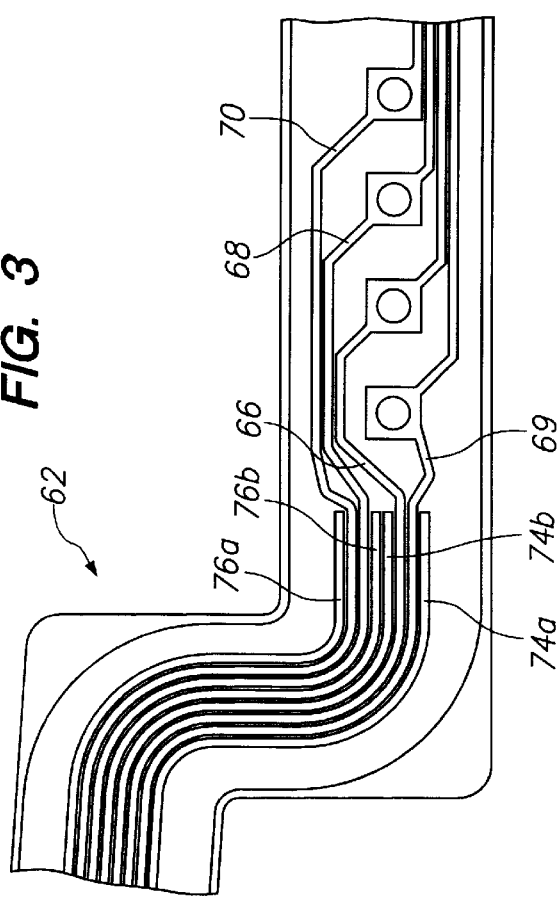
FIG. 4 is an enlarged detail plan view of a segment of the FIG. 3 trace interconnect array delineated by dashed line box 4 in FIG. 3 and showing a first end of the in-plane passive conductor traces.
Figure 5:
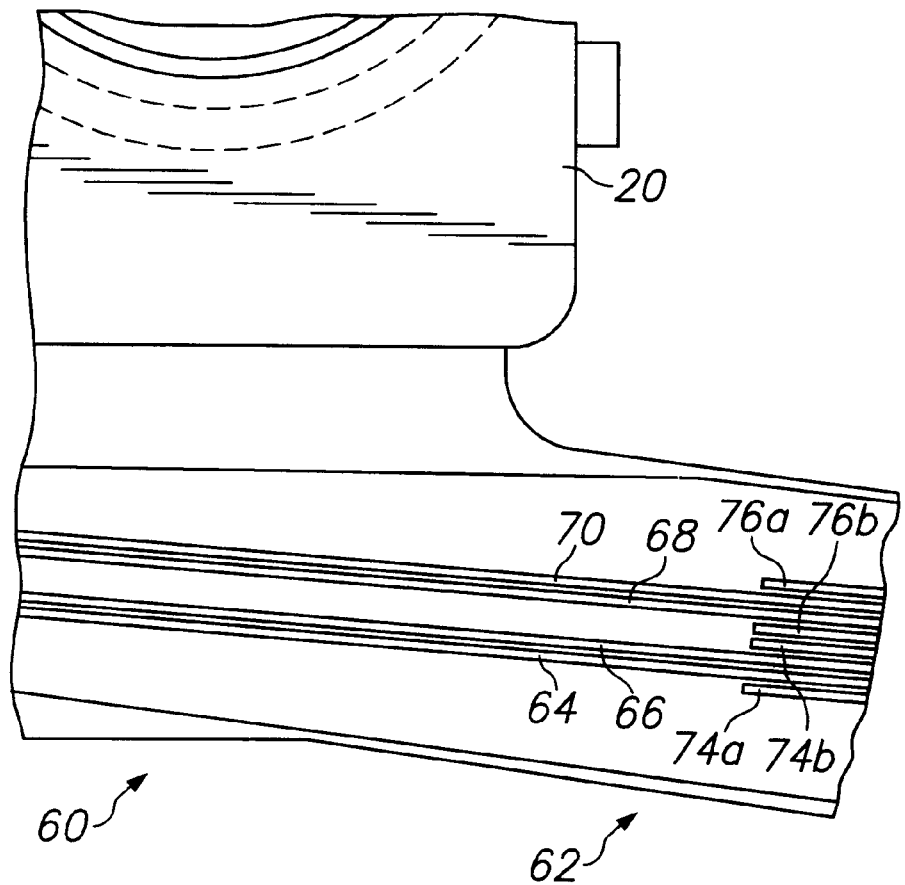
FIG. 5 is an enlarged detail plan view of another segment of the FIG. 3 trace interconnect array delineated by dashed line box 5 in FIG. 3 and showing a second end of the in-plane passive conductor traces.

As perhaps best viewed in FIGS. 4 and 5, trace/film segment 62 includes two major conductive path pairs: a read current path pair comprising conductors 64 and 66, and a write current path pair comprising conductors 68 and 70. The read current path pair comprising conductors 64 and 66 is positioned on the segment 62 in a space defined between the pair of passive conductor traces 74a and 74b. The write current path pair comprising conductors 68 and 70 is positioned on the segment 62 in another space defined between the pair of passive conductor traces 76a and 76b.

Figure 6A:
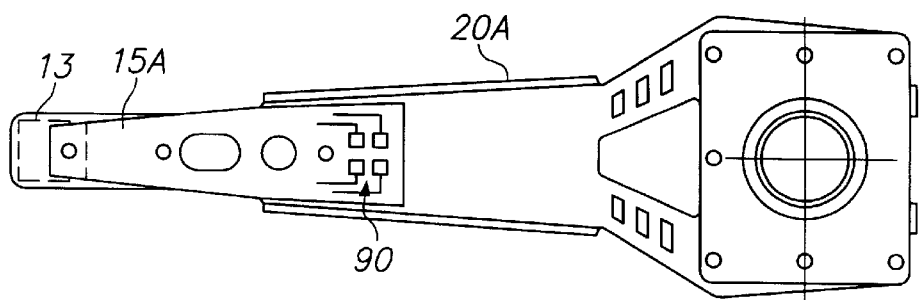
FIG. 6A is an enlarged diagrammatic plan view of an alternative head-gimbal-load beam assembly for use within the head disk assembly shown in FIG. 2.
Figure 6B:
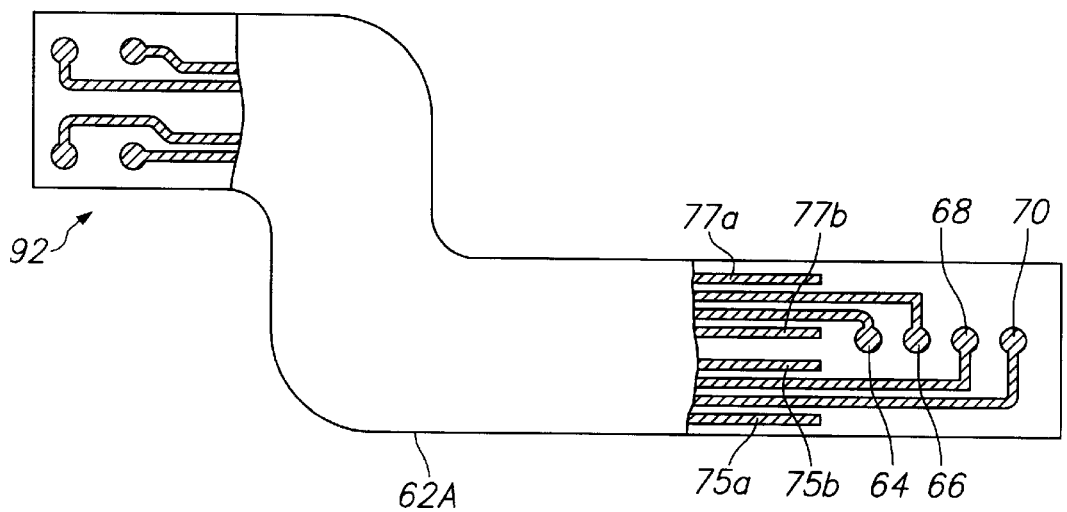
FIG. 6B is an enlarged diagrammatic plan view of a four-conductor conductor trace array scaled to be attached to the FIG. 6A head-gimbal-load beam assembly and incorporating passive conductor traces in accordance with principles of the present invention.

FIGS. 6A and 6B illustrate an alternative arrangement in which a flexure/conductor trace array 62A is secured to a load beam 20A. The head slider 13 is mounted to the flexure 15A and is connected to traces, not shown, leading to a connection pad area 90. Conductor trace array 62A is contoured so that when the array 62A is positioned on loadbeam 20A, a connection pad region 92, which is defined on array 62A, aligns with connection pad area 90, which is defined on loadbeam 20A. This alignment facilitates electrical connection between connection pad region 92 and connection pad area 90. This electrical connection between connection pad region 92 and connection pad area 90 can be accomplished by a suitable electrical connection method, such as ultrasonic bonding or soldering. It is important to note, however, that the passive conductor traces, as shown in FIG. 6B, are not included on the portion of the trace that contacts flexure structure 20A.

Figure 7:
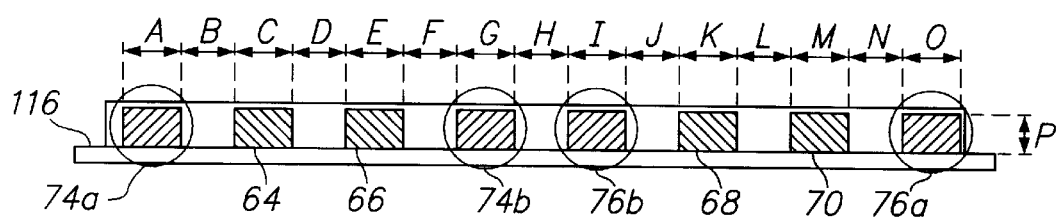
FIG. 7 is an enlarged diagrammatic cross-sectional view of a segment of a trace interconnect array having a plurality of in-plane pairs of conductive traces defined in spaces between a plurality of in-plane pairs of passive conductor traces.

FIG. 7 illustrates a cross-section of segment 62 (FIG. 3) having two pairs of current-carrying signal conductor traces 64/66 and 68/70, and two pairs of passive conductor traces 74a/74b and 76a/76b, which are all formed in a single layer on a polyimide base. Each pair of the current-carrying signal conductor traces has a forward current carrying trace 64 and 68 and a reverse current carrying trace 66 and 70. Segment 62 is formed on a polyimide insulating layer 116 and is supported in air. Segment 62 comprises one preferred conductor geometry and spacing as denoted by the FIG. 7 letters A, B, C, D, E, F, G, H, I, J, K, L, O, N, M, and O, which are 70, 30, 100, 30, 100, 30, 70, 70, 30, 100, 30, 100, 30, and 70 (which is labeled as 10030s in FIGS. 10–14 and where 10030s means trace arrangement with passive strips) microns respectively and where P is 18 microns throughout. Another preferred conductor geometry and spacing is similarly denoted by the FIG. 7 letters A–O, and would alternatively be 60, 30, 75, 40, 75, 30, 60, 60, 30, 75, 40, 75, 30, and 60 (which is labeled as 7540s in FIGS. 10–14 and where 7540s means trace arrangement with passive strips) microns respectively and where P is again 18 microns throughout. Yet another preferred conductor geometry and spacing is again similarly denoted by the FIG. 7 letters A–O, and this second alternative spacing would be 60, 70, 55, 60, 55, 70, 60, 60, 70, 55, 60, 55, 70, and 60, (which is labeled as 5560s in FIGS. 10–14 and where 5560s means trace arrangement with passive strips) microns respectively and where P is again 18 microns throughout.

Figure 8:
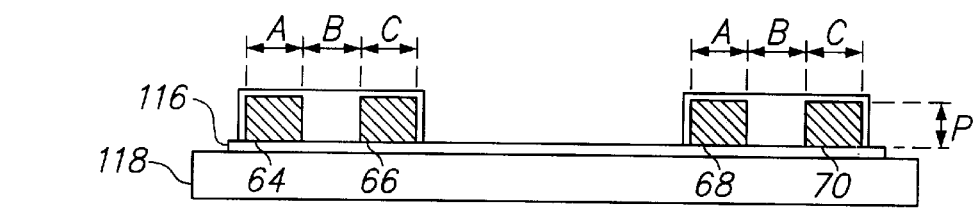
FIG. 8 is an enlarged diagrammatic cross-sectional view of a trace interconnect structure of a trace interconnect array.

FIG. 8 illustrates a cross-section of trace interconnect structure 60 (see FIG. 3). Interconnect structure 60 is formed on a polyimide insulating layer 116 which is supported by a substrate 118, which may be a thin stainless steel flexure, and/or a load beam as shown in FIG. 8. Trace interconnect structure 60 has a preferred conductor geometry denoted by the FIG. 8 letters A, B, and C, where A and C are trace widths that taper from 40 microns wide at a region adjacent to head 13 (which is labeled as 4030w in FIGS. 10–14 and where 4030w means trace arrangement without passive strips) to a conductor width of 100 microns wide at a region near the segment 62 (which is labeled as 10030w in FIGS. 10–14 and where 10030w means trace arrangement without passive strips), and where B is the inter-conductor spacing and is approximately equal to 30 microns throughout structure 60.

Figure 9:
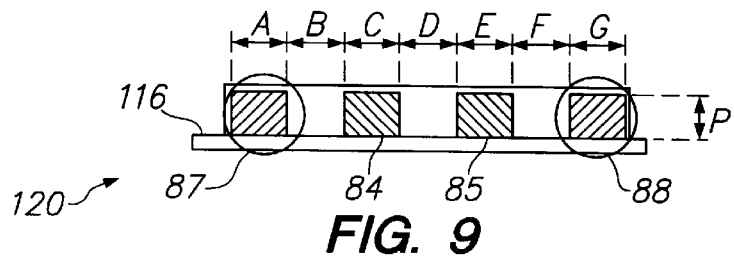
FIG. 9 is an enlarged diagrammatic cross-sectional view of one half of the FIG. 7 trace interconnect array having a pair of in-plane conductive traces defined in a space between a pair of in-plane passive conductor traces.

FIG. 9 is an enlarged view of another trace array 120 having a single pair of current-carrying signal conductor traces 84 and 85, one trace 84 carrying current at a particular instant in time in a forward direction and the other trace 85 carrying current at the same instant in time in a reverse direction. The single pair of current-carrying signal conductor traces 84 and 85 are formed in a space defined between a single pair of passive conductor traces 87 and 88, where the signal traces 84 and 85 and the passive traces 87 and 88 are all formed in a single layer on an insulative substrate. In this example, one preferred conductor geometry and spacing as denoted by the FIG. 9 letters A, B, C, D, E, F, and G are 70, 30, 100, 30, 100, 30, 70, microns respectively and where P is 18 microns throughout.

FIGS. 10–13 respectively present graphs of change in resistance, inductance, capacitance, and characteristic impedance of the trace/film segment 62 defined between the loadbeam and preamplifier/write driver circuit in accordance with the different conductor geometries and spacings, e.g., 10030s, 7540s, and 5560s referenced in the earlier description of FIG. 7. Additionally, FIGS. 11–14 respectively presents graphs of change in resistance, inductance, capacitance, and impedance of the trace interconnect structure 60 defined along the stainless steel flexure, and/or load beam in accordance with the different conductor geometries and spacings, e.g. 4030w and 10030w referenced in the earlier description of FIG. 8.

Figure 10:
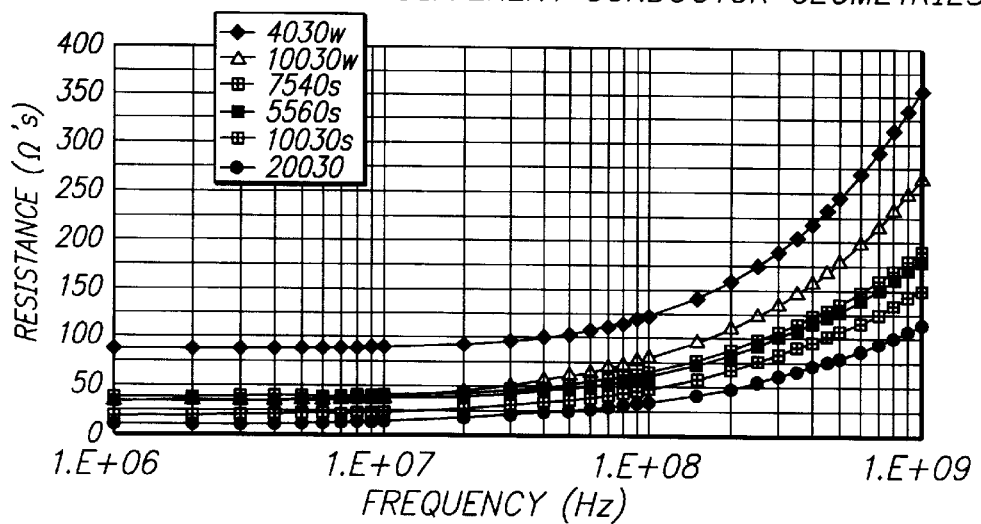
FIG. 10 is a graph plotting electrical resistance as a function of frequency for each of the FIGS. 7 and 8 trace interconnect array geometries and spacing arrangements.

Focusing in the region of 100 MHz, which is the approximate operating frequency of read/write head 13 (FIG. 2), FIG. 10 shows a slight increase in resistance in the segment 62 of the trace that incorporates passive conductor traces 74a, 74b, 76a, and 76b, as illustrated in graphs 7540s, 5560s, and 10030s.

Figure 11:
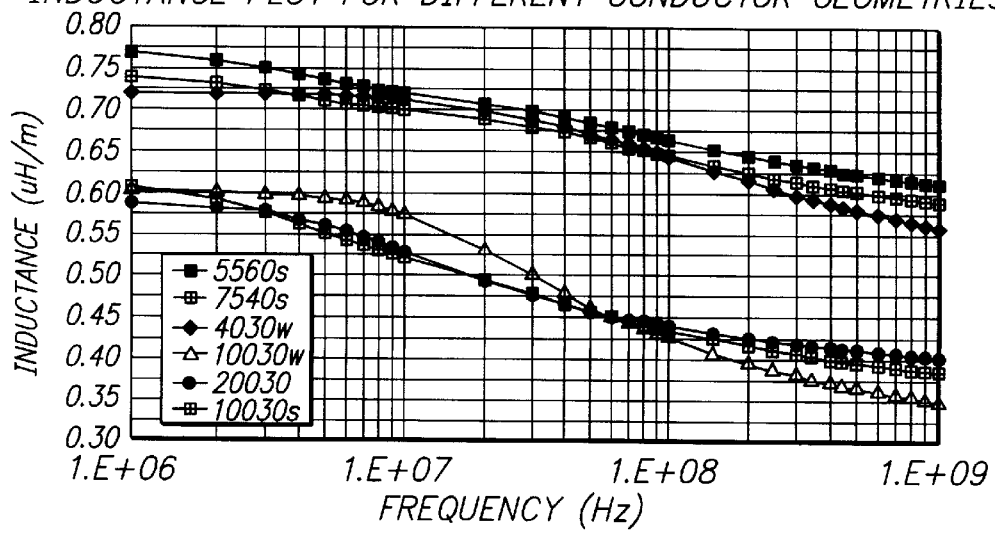
FIG. 11 is a graph plotting electrical inductance as a function of frequency for each of the FIGS. 7 and 8 trace interconnect array geometries and spacing arrangements.

FIG. 11 shows an increase in the inductance from conventional trace arrangement 20030 to trace arrangements 5560s and 7540s incorporating passive conductor traces 74a, 74b, 76a, and 76b. However, as shown on FIG. 11, the inductance of trace arrangements 5560s and 7540s nearly match the inductance of trace arrangement 4030w, which is presently preferred for connection between the read element (within head 13) and chip 54 (FIG. 2) via trace arrangements 5560s or 7540s. Thus, either trace arrangements 5560s or 7540s can be used in conjunction with passive conductor traces 74a, 74b, 76a, and 76b to provide substantially uniform inductance along interconnect structure 60 and segment 62. As also shown in FIG. 11, the inductance of conventional trace arrangement 20030, is substantially unchanged with respect to the inductance of trace arrangements 10030w or 10030s.

Figure 12:
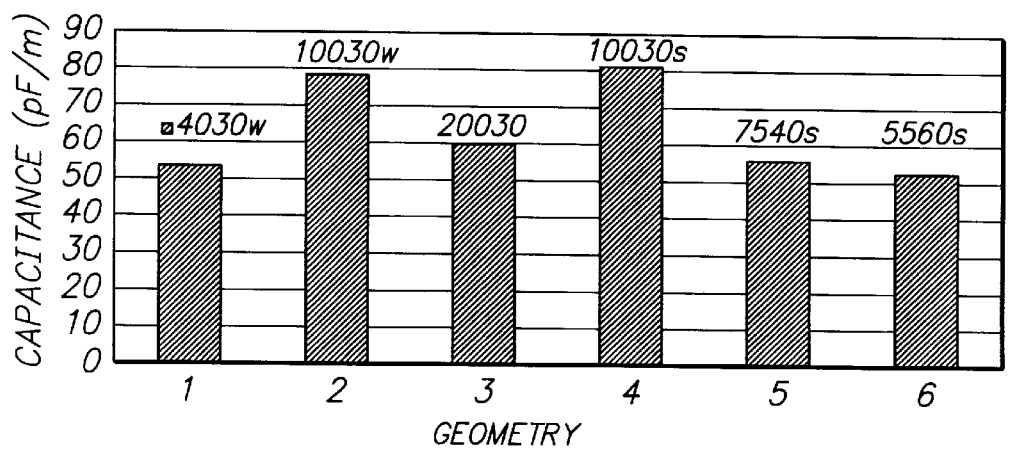
FIG. 12 is a graph plotting electrical capacitance calculations for each of the FIGS. 7 and 8 trace interconnect array geometries and spacing arrangements.

FIG. 12 illustrates the capacitance for the trace arrangements 4030w, 10030w, 20030, as well the capacitance for trace arrangements 10030s, 7540s, and 5560s incorporating the passive electrical conductor traces 74a, 74b, 76a, and 76b. If trace arrangement 4030w is employed on interconnect structure 60, then either trace arrangements 7540s or 5560s can be employed on trace/film segment 62 to substantially match the capacitance between interconnect structure 60 and trace/film segment 62. Additionally, if trace arrangement 10030w is employed on interconnect structure 60, then trace arrangement 10030s can be employed on trace/film segment 62 to again substantially match the capacitance between interconnect structure 60 and trace/film segment 62. In matching the capacitance of interconnect structure 60 and trace/film segment 62 as described above, an improvement is realized in the characteristic impedance of both the structure 60 and segment 62.

Figure 13:
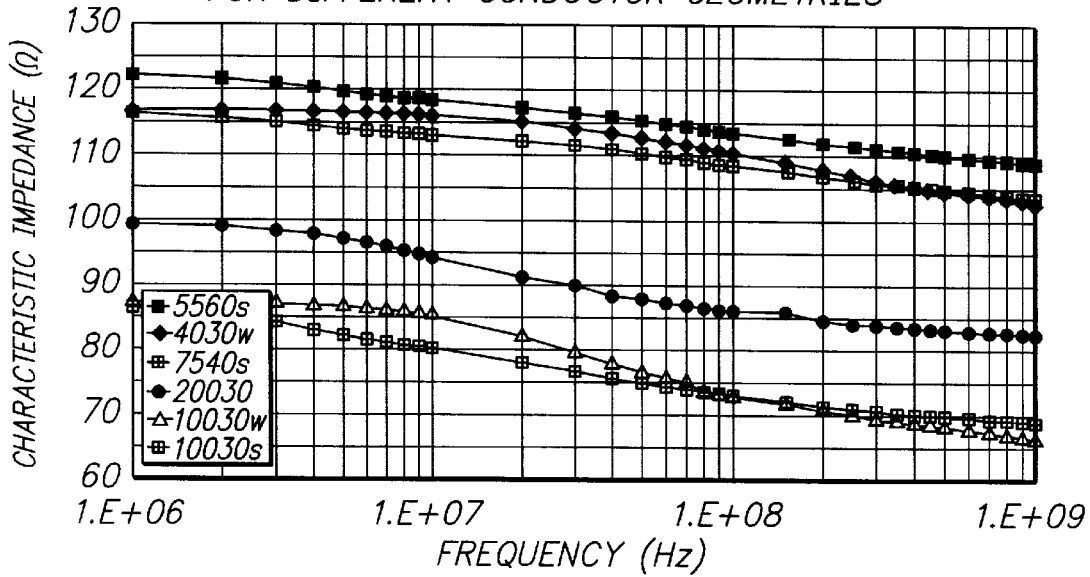
FIG. 13 is a graph plotting electrical characteristic impedance as a function of frequency for each of the FIGS. 7 and 8 trace interconnect array geometries and spacing arrangements.

FIG. 13 illustrates that the trace arrangements, 5560s, 7540s, and 10030s used in conjunction with the passive conductor traces 74a, 74b, 76a, and 76b, can substantially match the characteristic impedance of the trace interconnect structure 60 with the trace/film segment 62. In particular, the 5560s or the 7540s trace arrangements, defined on trace/film segment 62 containing passive conductor traces 74a, 74b, 76a, and 76b can be used to substantially match the characteristic impedance of trace arrangement 4030w defined on interconnect structure 60. Additionally, trace arrangement 10030s, defined on trace/film segment 62 and incorporating passive traces 74a, 74b, 76a, and 76b can be used to substantially match the characteristic impedance of trace arrangement 10030w defined on interconnect structure 60.

Presently, the 4030w trace arrangement is preferred as the trace geometry and spacing for connecting the head 13 (FIG. 2) with the chip 54 via segment 62, segment 62 having either the 5560s or 7540s trace arrangements. The 10030w trace arrangement is another preferred trace geometry and spacing for connecting the head 13 with the chip 54 via segment 62, when segment 62 has a 10030s trace arrangement.

Conductor trace array 100 (FIGS. 3 and 4) exhibits a substantially uniform characteristic impedance by providing electrically isolated, passive conductor traces 74a, 74b, 76a, and 76b adjacent to each of the current-carrying signal traces 64, 66, 68, and 70. This uniform characteristic impedance is particularly desirable for reducing data signal distortion and data signal reflections that would otherwise occur over the signal traces.

Another advantage of the present invention is that the conductor trace array 100 having the improved electrical characteristics is formed within a single layer, which can be manufactured by existing low cost and low complexity techniques.

Although the present invention has been described in terms of the presently preferred embodiment, i.e., a deposited conductor trace array which increases conductor capacitance without significantly increasing circuit distributed inductance, it should be clear to those skilled in the art that the present invention may also be utilized in conjunction with, for example, an integrated gimbal load beam structure, or other conductive suspension members having proximately mounted, deposited, or embedded conductors with insulating overcoatings and shielding thereon. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A trace interconnect structure for electrically connecting a drive circuitry to a head of a disk drive, the disk drive including an E-block and a load beam securing the head to the E-block, the trace interconnect structure comprising:
   a support substrate that extends along the E-block; and
   a trace film segment that is secured to the support substrate and extends along the E-block from near the load beam to the drive circuitry, the trace film segment having a trace film characteristic impedance, the trace film segment including a signal conductor trace array that includes a first pair of signal conductor traces, and a passive conductor trace array that includes a first pair of passive conductor traces, wherein the first pair of signal conductor traces is positioned between the first pair of passive conductor traces.

2. The trace interconnect structure of claim 1 wherein the support substrate extends from near the head to near the drive circuitry.

3. The trace interconnect structure of claim 1 further comprising a suspension array segment that extends from the trace film segment to the head, the suspension array segment electrically connecting the head to the signal conductor trace array, the suspension array segment having a suspension characteristic impedance; wherein the passive conductor trace array is positioned, sized and shaped so that the trace film characteristic impedance is approximately equal to the suspension characteristic impedance.

4. The trace interconnect structure of claim 1 wherein the signal conductor trace array and the passive conductor trace array are substantially coplanar.

5. The trace interconnect structure of claim 4 wherein the first pair of electrical signal conductor traces and the first pair of passive electrical conductor traces follow substantially parallel paths between the load beam and the drive circuitry.

6. The trace interconnect structure of claim 5 wherein the signal conductor trace array includes a plurality of spaced-apart pairs of signal conductor traces, and the passive conductor trace array includes a plurality of spaced-apart pairs of passive conductor traces.

7. The trace interconnect structure of claim 6 wherein the pairs of signal conductor traces are each positioned between corresponding pairs of passive conductor traces.

8. The trace interconnect structure of claim 7 wherein at least one pair of signal conductor traces electrically connects a read element of the head to a preamplifier circuit of the drive circuitry, and at least one pair of the signal conductor traces electrically connects a write element of the head to a write driver of the drive circuitry.

9. A disk drive including the E-block and the trace interconnect structure of claim 1.

10. An E-block assembly for a disk drive, the disk drive including a drive circuitry, a load beam and a head, the E-block assembly comprising:
    an E-block that supports the load beam; and
    a trace film segment having a trace film characteristic impedance, the trace film segment including (i) a support substrate that extends along the E-block from the drive circuitry to the load beam, (ii) a signal conductor trace array including a first pair of signal conductor traces, the signal conductor trace array being secured to the support substrate and extending along the E-block, and (iii) a passive conductor trace array including a first pair of passive conductor traces, the passive conductor trace array being secured to the support substrate and extending along the E-block, wherein the first pair of signal conductor traces is positioned between the first pair of passive conductor traces.

11. The E-block assembly of claim 10 wherein the first pair of signal conductor traces and the first pair of passive conductor traces extend substantially from the load beam to the drive circuitry, and wherein the signal conductor trace array and the passive conductor trace array are substantially coplanar.

12. The E-block assembly of claim 10 further comprising a suspension array segment that extends from the trace film segment to the head, the suspension array segment electrically connecting the head to the signal conductor trace array, the suspension array segment having a suspension characteristic impedance; wherein the passive conductor trace array is positioned, sized and shaped so that the trace film characteristic impedance is approximately equal to the suspension characteristic impedance.

13. The E-block assembly of claim 10 wherein the first pair of electrical signal conductor traces and the first pair of passive electrical conductor traces follow substantially parallel paths between the load beam and the drive circuitry.

14. The E-block assembly of claim 13 wherein the signal conductor trace array includes a plurality of spaced-apart pairs of signal conductor traces, and the passive conductor trace array includes a plurality of spaced-apart pairs of passive conductor traces.

15. The E-block assembly of claim 14 wherein the pairs of signal conductor traces are each positioned between corresponding pairs of passive conductor traces.

16. The E-block assembly of claim 15 wherein at least one pair of signal conductor traces electrically connects a read element of the head to a preamplifier circuit of the drive circuitry, and wherein at least one pair of the signal conductor traces electrically connects a write element of the head to a write driver of the drive circuitry.

17. A disk drive including the E-block assembly of claim 10.

18. A method of electrically connecting a head to a drive circuitry of a disk drive, the disk drive including an E-block and a load beam that secures the head to the E-block, the method comprising the steps of:

positioning a first pair of passive conductor traces along the E-block, the passive conductor traces extending between the load beam and the drive circuitry; and positioning a first pair of signal conductor traces between the passive conductor traces along the E-block, the signal conductor traces extending between the head and the drive circuitry.

* * * * *